(12) United States Patent
Yan

(10) Patent No.: US 7,767,755 B2
(45) Date of Patent: Aug. 3, 2010

(54) COMPOSITION INCLUDING MULTIPLE FUNCTIONALIZED POLYMERS

(75) Inventor: Yuan-Yong Yan, Copley, OH (US)

(73) Assignee: Bridgestone Corporation (JP)

( * ) Notice: Subject to any disclaimer, the term of this patent is extended or adjusted under 35 U.S.C. 154(b) by 426 days.

(21) Appl. No.: 11/734,298

(22) Filed: Apr. 12, 2007

(65) Prior Publication Data

US 2007/0293622 A1 Dec. 20, 2007

Related U.S. Application Data

(60) Provisional application No. 60/791,806, filed on Apr. 13, 2006.

(51) Int. Cl.
   *C08G 67/02* (2006.01)
   *C08F 36/00* (2006.01)
(52) U.S. Cl. .................. 524/612; 525/331.9; 525/332.3
(58) Field of Classification Search .................. 524/612, 524/572, 574, 765; 525/331, 332.3, 332, 525/342, 351
See application file for complete search history.

(56) References Cited

U.S. PATENT DOCUMENTS

| | | | |
|---|---|---|---|
| 6,046,288 A * | 4/2000 | Lawson et al. ............... | 526/175 |
| 6,369,167 B1 * | 4/2002 | Morita et al. ................ | 525/342 |
| 7,534,839 B2 * | 5/2009 | Lawson et al. ............ | 525/331.9 |
| 2004/0254301 A1 | 12/2004 | Tsukimawashi et al. | |
| 2006/0135701 A1 | 6/2006 | Lawson et al. | |
| 2007/0037956 A1 | 2/2007 | Hogan et al. | |
| 2007/0078232 A1 | 4/2007 | Yan | |
| 2007/0149744 A1 | 6/2007 | Yan et al. | |

FOREIGN PATENT DOCUMENTS

| | | |
|---|---|---|
| EP | 1 790 666 A1 | 5/2007 |
| WO | WO 2006/128158 A1 | 11/2006 |
| WO | WO 2007/015872 A1 | 2/2007 |

OTHER PUBLICATIONS

P.C. Traas et al., "A Versatile Synthesis of α,β-Unsaturated Aldehydes from Tosylhydrazones," *Tetrahedron Letters*, 1976, vol. 26, pp. 2287-2288 (Pergamon Press, Great Britain).
N.S. Narasimhan et al., "Synthetic Application of Lithiation Reactions: Part XIII. Synthesis of 3-Phenylcoumarins and Their Benzo Derivatives," *Synthesis*; 1979, pp. 906-909 (Nov. 1979, Georg Thieme Publishers).
G.A. Olah et al., "Aldehydes by Formylation of Grignard or Organolithium Reagents with N-Formylpiperidine," *Angew. Chem. Int. Ed. Engl.*, 1981, vol. 20, No. 10, pp. 878-879 (Verlag Chemie GmbH; Weinheim, Germany).
G.A. Olah et al., "Formyl Transfer to Grignard Reagents with N-Formylpiperidine: 3-Phenylpropionaldehyde," *Organic Syntheses*, 1986, vol. 64, pp. 114-116 (Organic Syntheses, Inc.).
N. Nagata et al., "Effect of Chemical Modification of Solution-Polymerized Rubber on Dynamic Mechanical Properties in Carbon-Black-Filled Vulcanizates," *Rubber Chem. and Tech.*, 1987, vol. 60, pp. 837-855 (American Chemical Society; Washington, DC).
K. Ueda et al., "Synthesis of Polymers with Amino End Groups. 3. Reactions of Anionic Living Polymers with α-Halo-ω-aminoalkanes with a Protected Amino Functionality," *Macromolecules*, 1990, vol. 23, No. 4, pp. 939-945 (American Chemical Society; Washington, DC).
R.P. Quirk et al., "Anionic Synthesis of Primary Amine-Functionalized Polystyrenes Using 1-[4-[N,N-Bis(trimethylsilyl)amino]phenyl]-1-phenylethylene," *Macromolecules*, 1993, vol. 26, No. 6, pp. 1206-1212 (American Chemical Society; Washington, DC).
R.P. Quirk et al., "Anionic synthesis of ω-dimethylamino-functionalized polymers by functionalization of polymeric organolithiums with 3-dimethylaminopropyl chloride," *Poly. Int.*, 1999, vol. 48, pp. 99-108 (Society of Chemical Industry; London, England).
R.P. Quirk et al., "Quantitative Amine Functionalization of Polymeric Organolithium Compounds with 3-Dimethylaminopropyl Chloride in the Presence of Lithium Chloride," *J. Poly. Sci.: Part A: Polymer Chem.*, 2000, vol. 38, pp. 145-151 (J. Wiley & Sons, Inc.; Hoboken, NJ).
R.P. Quirk et al., "Anionic Synthesis of Well-Defined Polymers with Amine End Groups," *Macromol. Symp.*, 2000, vol. 157, pp. 161-169 (Wiley-VCH Verlag GmbH; Weinheim, Germany).
R.P. Quirk et al., "Anionic Synthesis of Secondary Amine Functionalized Polymers by Reaction of Polymeric Organolithiums with N-Benzylidenenethylamine," *Macromol. Chem. Phys.*, 2002, vol. 203, No. 9, pp. 1178-1187 (Wiley-VCH Verlag GmbH; Weinheim, Germany).

* cited by examiner

*Primary Examiner*—Vasu Jagannathan
*Assistant Examiner*—Hannah Pak
(74) *Attorney, Agent, or Firm*—Meredith E. Hooker; Dave Burleson

(57) ABSTRACT

A composition that includes functionalized polymers and particulate filler is provided. The composition includes at least three components: (1) a polymer that includes a first type of functionality such as a functional group including a primary or secondary amine functionality, (2) a polymer that includes a second type of functionality such as an alkoxysilane or other silica interacting functionality, and (3) at least two types of particulate filler. One of the functionalized polymers can be made in the presence of the other.

20 Claims, No Drawings

US 7,767,755 B2

COMPOSITION INCLUDING MULTIPLE FUNCTIONALIZED POLYMERS

CROSS REFERENCE TO RELATED APPLICATION

This application claims the benefit of U.S. provisional patent application No. 60/791,806, filed Apr. 13, 2006, the disclosure of which is incorporated herein by reference.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Typically, filler(s), elastomeric material(s), and additives are chosen so as to provide a composition from which can be made rubber articles with an acceptable compromise or balance of performance properties such as traction, abrasion resistance, hysteresis, etc. Ensuring that reinforcing filler(s) are well dispersed throughout the elastomeric material(s) both enhances processability and acts to improve physical properties. Dispersion of fillers can be improved by increasing their interaction with the elastomer(s). Examples of efforts of this type include high temperature mixing in the presence of selectively reactive promoters, surface oxidation of compounding materials, surface grafting, and chemical modifications to the terminal ends of the polymers.

Chemical modification or functionalization of the polymers to increase interactivity between the polymer and the particulate filler(s) also can counteract the tendency of filler particles to agglomerate. Dissociation of such agglomerates can negatively impact physical properties of articles made from filled compositions; thus, reduction of the tendency of filler particles to agglomerate also is desirable.

Use of compositions that employ more than one type of particulate filler is growing. Functionalized polymers, i.e., polymers that include one or more functional groups (typically terminal functionality), interact differently with different fillers. Adequate interactivity often is sought by blending two or more differently functionalized polymers, an that approach assumes that functional groups that interact with a particular filler will exhibit the same or similar interactivity in a mixed filler system. Some have attempted to provide multiple functionalities in a single reaction scheme; see, e.g., U.S. patent publ. no. 2006/0135701 A1 which teaches a sequential functionalization-termination process whereby multiple functional groups can be attached to the same polymer chain.

Where an elastomer is made by anionic polymerization techniques, attachment of certain functional groups is difficult due to the fact that carbanions, such as living polymers, are terminated by active hydrogen atoms present in, e.g., primary and secondary amine groups. However, amine functional groups provide desirable interaction with particulate fillers, particularly carbon black, so commercially useful methods of providing living polymers with amine functionality remain desirable. Because interactivity with fillers tends to increase as the number of hydrogens bonded to the amino nitrogen increases, the provision of secondary and primary amine-functionalized polymers is particularly desirable.

One procedure for providing amine functionality to anionically initiated polymers is described by K. Ueda et al., "Synthesis of Polymers with Amino End Groups-3. Reactions of Anionic Living Polymers with α-Halo-ω-aminoalkanes with a Protected Amino Functionality," *Macromolecules*, 1990, 23, 939-45. Anionic living polystyrene is reacted with an α-halo-ω-aminoalkane followed by de-protection of the trialkylsilyl-protected amine functionality to provide a primary amino-functionalized polystyrene. The academic laboratory conditions employed limit the utility of this procedure, however, a fact recognized by other academic publications; see, e.g., R. Quirk et al., "Anionic Synthesis of ω-Dimethylamino-Functionalized Polymers by Functionalization of Polymeric Organolithiums with 3-Dimethylaminopropyl Chloride," *Polym. Int.*, 1999, 48, 99-108.

SUMMARY

The appended claims set forth a process for preparing polymers that include differing functional groups and compositions made with such polymers and via such a process.

In one aspect is provided a composition that includes first and second functionalized polymers, carbon black particulate filler, and silica particulate filler. The first functionalized polymer includes at least one functional group including at least one nitrogen atom, the second functionalized polymer includes at least one functional group including at least one alkoxysilane moiety, and one of the first and second functionalized polymers is created in the presence of the other. The first type of functional group constitutes from about 25 to about 50% of the sum of the first and second types of functional groups.

In another aspect is provided a composition that includes at least two types of particulate filler. The composition is made by a process that includes providing a composition including living polymer chains; allowing a portion of the chains to react with a first composition so as to provide a first functionalized polymer; and introducing a second compound to the composition and allowing another portion of the chains to react with the second compound so as to provide a second functionalized polymer in the presence of said first functionalized polymer. The first functionalized polymer interacts preferentially with one of the types of particulate filler, and the second functionalized polymer interacts preferentially with another of the types of particulate filler.

In a further aspect is provided a process that includes providing a composition including living polymer chains; allowing a portion of the chains to react with a first compound so as to provide a first functionalized polymer; and introducing a second compound to the composition and allowing another portion of the chains to react with the second compound so as to provide a second functionalized polymer in the presence of the first functionalized polymer. The first functionalized polymer interacts preferentially with one type of particulate filler, and the second functionalized polymer interacts preferentially with another type of particulate filler.

The following detailed description further explains the foregoing aspects and may include other aspects. To assist in understanding that description, certain definitions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants (normally monomers) and is inclusive of random, block, segmented, graft, etc., copolymers;

"interpolymer" means a polymer that includes mer units derived from at least two reactants (normally monomers) and is inclusive of copolymers, terpolymers, tetrapolymers, and the like;

"polyene" means a molecule with at least two double bonds located in the longest portion or chain thereof, and specifically includes dienes, trienes, and the like;

"terminus" means an end of a polymer chain;

when used as an adjective, "terminal" means that group or moiety which is located at the terminus of a molecule or polymer chain (for example, a terminal amino group would be an amino group that is located at a terminus);

"drop temperature" means a prescribed upper temperature at which a compound is evacuated from the mixing equipment (e.g., a Banbury mixer) to a mill for being worked into sheets;

"protected amino group" means an amino group having an amino nitrogen atom bonded to atoms other than hydrogen but capable of being converted to a primary or secondary amino group, with the proviso that the group does not terminate (i.e., react directly with) a carbanion such as a living polymer; and "hysteresis" means the difference between the energy applied to deform an article made from an elastomeric compound and the energy released as the article returns to its initial, non-deformed state.

DETAILED DESCRIPTION

The composition includes at least two types of functionalized polymers. One of the functionalized polymers includes a polymeric chain with a terminal functional group that includes at least one nitrogen atom; the amino functional group can include at least one hydrogen atom bonded to the nitrogen atom, i.e., a primary or secondary amine. Another of the functionalized polymers includes a polymeric chain with another functional group. In one embodiment, the first functionalized polymer constitutes from about 25 to about 50% of the total amount of functionalized polymers. In another embodiment, one of the functionalized polymers is prepared in the presence of another of the functionalized polymers.

The polymeric chain can be elastomeric and can include mer units that include unsaturation. Such units can be derived from polyenes, particularly dienes and trienes (e.g., myrcene). Illustrative polyenes include $C_4$-$C_{12}$ dienes, particularly conjugated dienes such as, but not limited to, 1,3-butadiene, isoprene, 1,3-pentadiene, 2,3-dimethyl-1,3-butadiene, and 1,3-hexadiene. Homo- and interpolymers that include just polyene-derived mer units constitute one illustrative type of elastomer.

The polymeric chain also can include pendent aromatic groups such as can be provided through incorporation of mer units derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, mer units with pendent aromaticity can constitute from about 1% to about 50% by wt., from about 10% to about 45% by wt., or from about 20% to about 35% by wt., of the polymer chain; such interpolymers constitute one exemplary class of polymers. The microstructure of such interpolymers can be random, i.e., the mer units derived from each type of constituent monomer preferably do not form blocks and, instead, are incorporated in a non-repeating, essentially simultaneous manner. Random microstructure can provide particular benefit in certain end use applications such as, e.g., rubber compositions used in the manufacture of tire treads.

Exemplary elastomers include poly(butadiene), (poly)isoprene (either natural or synthesized), and interpolymers of butadiene and styrene such as, e.g., copoly(styrene/butadiene) also known as SBR.

Polyenes can incorporate into polymeric chains in more than one way. Especially for tire tread applications, controlling this manner of incorporation can be desirable. A polymer chain with an overall 1,2-microstructure, given as a numerical percentage based on total polyene content, of from about 1° to about 80%, optionally from about 25 to 65%, can be desirable for certain end use applications. A polymer that has an overall 1,2-microstructure of no more than about 50%, preferably no more than about 45%, more preferably no more than about 40%, even more preferably no more than about 35%, and most preferably no more than about 30%, based on total polyene content, is considered to be "substantially linear".

The number average molecular weight ($M_n$) of the polymer typically is such that a quenched sample exhibits a gum Mooney viscosity ($ML_4/100°$ C.) of from ~2 to ~150, more commonly from ~2.5 to ~125, even more commonly from ~5 to ~100, and most commonly from ~10 to ~75. Exemplary $M_n$ values range from ~5000 to ~200,000, commonly from ~25,000 to ~150,000, and typically from ~50,000 to ~125,000.

The foregoing polymers can be made by emulsion polymerization or solution polymerization, with the latter affording greater control with respect to such properties as randomness, microstructure, etc. Solution polymerizations have been performed since about the mid-20th century; the general aspects thereof are known to the ordinarily skilled artisan, but certain aspects are provided here for convenience of reference.

Solution polymerization typically involves an initiator. Exemplary initiators include organolithium compounds, particularly alkyllithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyllithium compounds such as diethylaminopropyllithium; and those trialkyl stanyl lithium compounds involving $C_1$-$C_{12}$, preferably $C_1$-$C_4$, alkyl groups.

Multifunctional initiators, i.e., initiators capable of forming polymers with more than one living end, also can be used; however, use of these initiators can result in polymers with different functionalities at each terminus which, in certain circumstances, can present processing challenges, e.g., undesirably high compound Mooney viscosities. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

Also useful are the so-called functionalized initiators that become incorporated into the polymer chain, thus providing a functional group at the initiated end of the chain. Examples of such materials include the reaction product of organolithium compounds and, for example, N-containing organic compounds (e.g., substituted aldimines, ketimines, secondary amines, etc.) optionally pre-reacted with a compound such as diisopropenyl benzene. A more detailed description of these materials can be found in, e.g., U.S. Pat. Nos. 5,153,159 and 5,567,815.

Typical solution polymerization solvents include various $C_5$-$C_{12}$ cyclic and acyclic alkanes as well as their alkylated derivatives, certain liquid aromatic compounds, and mixtures thereof. Solvents that contain active hydrogen atoms can quench anionic polymerization and thus (typically) are avoided.

In solution polymerizations, both randomization of the mer units and vinyl content (i.e., 1,2-microstructure) can be increased through inclusion of a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer employed, the reaction temperature, and the nature of the specific coordinator employed. Compounds useful as coordinators include organic compounds having a heteroatom with a non-bonded pair of electrons (e.g., O or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes such as 2,2'-di(tetrahydrofuryl)propane, dipiperidyl ethane, hexamethylphosphoramide, N,N'-dimethylpiperazine, diazabicyclooctane, diethyl ether, tributylamine, and the like. Details of linear and cyclic oligomeric oxolanyl coordinators can be found in U.S. Pat. No. 4,429,091, the teaching of which relating to the manufacture and use of such materials is incorporated by reference herein.

The conditions typically employed in solution polymerization are known, although a representative description is provided for the convenience of the reader. The following is based on a batch process, although extending this description to other processes such as semi-batch or continuous is within the capability of the ordinarily skilled artisan.

Polymerizations typically begin by charging a blend of monomer(s) and solvent to a suitable reaction vessel, followed by addition of coordinator (if used) and initiator, which often are added as part of a solution or blend; alternatively, monomer(s) and coordinator can be added to the initiator. Anhydrous, anaerobic conditions typically are employed. The reactants can be heated to a temperature of up to about 150° C. and agitated. After a desired degree of conversion has been reached, the heat source (if used) can be removed. If the reaction vessel is to be reserved solely for polymerizations, the reaction mixture can be removed to a post-polymerization vessel for functionalization and/or quenching.

At this point, the reaction mixture commonly is referred to as a "polymer cement" because of its relatively high concentration of polymer, typically at least double the concentrations encountered in the types of lab-scale polymerizations employed by Ueda et al., discussed above. The polymer cement can be considered to be a relatively viscous composition that includes numerous live (carbanion) polymer chains. Functionalization occurs prior to these carbanions being quenched.

The description of sequential functionalization that follows uses two steps to provide two functionalized polymers; this teaching can be extended by the ordinarily skilled artisan to cover the provision of more than two functionalized polymers through use of additional steps, use of multiple functionalizing compounds in one or more of the functionalization reactions, and the like.

Further, the following description teaches provision of carbon black-interactive functionality first followed by provision of silica-interactive functionality, specifically, reaction with a compound that leads to amino functionalization followed by reaction with a silicate to provide (alkoxy)silane functionalization. The ordinarily skilled artisan can envision variations of this order.

In considering order of functionalization, one issue that can have some practical effect or consequence is the tendency of certain functional groups to result in undesired coupling reactions, which can complicate the processing of functionalized polymers. Accordingly, in the following description, first reacting some of the polymer chains with a protected amino group-containing compound can be preferable because this reaction results in a functional group that does not tend to participate in coupling reactions.

First functionalization can be effected by introducing to the polymer cement a compound that includes at least one protected amino group. The ordinarily skilled artisan can envision many such compounds, but two broad categories are provided for purpose of illustration.

One amino group-containing material includes at least one electrophilic functionality in addition to a protected amino group; these materials are referred to herein as category A reactants. A convenient electrophilic group is a halogen atom (preferably Cl, Br, or I), which can react readily with the countercation of the living (carbanion) polymer, typically an alkali metal ion such as $Li^+$. In these materials, the nitrogen atom of the protected amino group can bond to groups that generally are not reactive toward living polymers yet can be removed selectively and completely under conditions that do not degrade such polymers. Examples of such materials include the class of materials known as aza-disilacycloalkanes, particularly those where the ring structure includes 5 or 6 atoms and those where each Si atom is di-substituted; specific examples include 1-(3-halopropyl)-2,2,5,5-tetramethyl-1-aza-2,5-disilacyclopentane, 1-(3-halopropyl)-2,2,5, 5-tetraethyl-1-aza-2,5-disilacyclopentane, 1-(3-halopropyl)-2,2,6,6-tetramethyl-1-aza-2,6-disilacyclopentane, 1-(3-halopropyl)-2,2,6,6-tetraethyl-1-aza-2,6-disilacyclohexane, 1-(2-haloethyl)-2,2,5,5-tetramethyl-1-aza-2,5-disilacyclopentane, and the like. The halogen atom can be spaced from the amino nitrogen by a $C_2$-$C_3$ alkyl chain, and the alkyl groups attached to the Si atoms can be (independently) $C_1$-$C_2$ alkyl groups. For reasons including cost and commercial availability, a preferred category A reactant is 1-(3-bromopropyl)-2,2,5,5-tetramethyl-1-aza-2,5-disilacyclopentane.

Because of the reactivity of living polymers with electrophilic moieties such as halogen atoms, the reaction of category A reactants with living polymers can be performed quickly (e.g., ~15-60 min.) using relatively mild conditions (e.g., ~25°-75° C. and atmospheric or slightly elevated pressures).

A living polymer with a protected amino functional group also can be provided by reacting the living polymer with a compound that includes at least one —NR'—C(Z)-portion, e.g., a heterocyclic compound that includes within its ring structure one or more —NR'—C(Z)-units, where Z can be S or O and R' is an alkyl or aryl group; these materials are referred to herein as category B reactants. The size of the ring structure is not believed to be critical, although compounds with 5- through 8-membered rings typically are more readily available. In these compounds, the bond between the substituted nitrogen atom and the carbonyl group tends to open readily in the presence of a carbanion such as a living polymer; this provides a convenient mechanism for introducing a protected amino functional group into a living polymer. Specific examples of category B reactants include N-substituted lactams such as N-methyl-β-propiolactam, N-tert-butyl-β-propiolactam, N-phenyl-β-propiolactam, N-naphthyl-β-propiolactam, N-methyl-ε-caprolactam, N-phenyl-ε-caprolactam, N-vinyl-ε-caprolactam, N-benzyl-ε-caprolactam, N-naphthyl-ε-caprolactam, N-methyl-ω-laurylolactam, N-phenyl-ω-laurylolactam, N-tert-butyl-ω-laurylolactam, N-vinyl-ω-laurylolactam, N-benzyl-ω-laurylolactam, N-methyloctalactam, and the like; pyrrolidinones (often referred to as pyrollidones) such as N-methyl-2-pyrrolidone, N-tert-butyl-2-pyrrolidone, N-phenyl-2-pyrrolidone, N-vinyl-2-pyrrolidone, N-benzyl-2-pyrrolidone, N-naphthyl-2-pyrrolidone, N-methyl-5-methyl-2-pyrrolidone, N-tert-butyl-5-methyl-2-pyrrolidone, N-phenyl-5-methyl-2-pyrrolidone, and the like; imidazolidinones such as, e.g., 1,3-dialkyl-2-imidazolidinone; piperidones such as N-methyl-2-piperidone, N-tert-butyl-2-piperidone, N-phenyl-2-piperidone, N-methoxyphenyl-2-piperidone, N-vinyl-2-piperidone, N-benzyl-2-piperidone, N-naphthyl-2-piperidone, and the like; and pyrimidinones such as, e.g., 1,3-dimethyl-3,4,5,6-tetrahydro-2(1H)-pyrimidinone. (Although each of the foregoing examples utilizes O as Z, the corresponding compounds where Z is S also can be mentioned as exemplary materials.)

First functionalization also can be effected by introducing to the polymer cement a compound that includes at least one C=N moiety such as, for example, oximes, imines, azines, and hydrazones. Some of these compounds, particularly hydrazones, allow more precise stoichiometric control than category A or B reactants because they do not include sites that can be involved in side reactions.

When the foregoing are added to a polymer cement, they react at the location of the anionic portion of the carbanion, typically the ends of the longest polymeric chain. Where a multifunctional initiator is employed during polymerization, reaction with the foregoing types of compounds can occur on each terminus of the polymer.

Mixing of a type commonly employed in commercial processes is sufficient to ensure near complete reaction between the living polymer and the compound(s) that provides a protected amino functional group.

Because subsequent reaction with another type of compound (so as to provide a second type of functionality) is envisioned, a less-than-stoichiometric amount of the compound(s) that provides a protected amino functional group is used. This leaves some amount of living polymer chains available for further, different functionalization. A less-than-stoichiometric amount can range from anything less than 1.0 to anything more than zero, both based on the amount of available initiating equivalents (i.e., the amount of functionalizing compound used is based on the equivalents of initiator added to the reactor, which may or may not reflect the amount of initiator actually associated with polymer chains). As an example of the foregoing, one mole of a standard organolithium initiator theoretically leads to one mole of living (carbanion) polymer chains, which means that one mole of available sites, typically located at a terminal end of each chain, are available for functionalization and that less than one equivalent of a first functionalizing agent is added or provided. The amount of first functionalizing compound used or added (based on the equivalents of initiator) typically is no more than about 0.75 equivalents, more commonly no more than about 0.6 equivalents, and most commonly no more than about 0.5 equivalents. One useful range of amounts of the first functionalizing compound is from about 0.2 to about 0.5 equivalents; another is from about 0.25 to about 0.4 equivalents; and yet another is from about 0.3 to about 0.35 equivalents. (Because many category A and B reactants include sites that can be involved in side reactions, addition of a particular number of equivalents of these types of first functionalizing compounds does not necessarily result in an identical number of functionalized polymers. Accordingly, addition of 0.32 equivalents of a category A first functionalizing compound might result in, e.g., 0.29-0.31 equivalents of functionalized polymers.)

Use of a less-than-stoichiometric amount of the first functionalizing compound leaves a number of live sites, i.e., living (carbanion) polymer chains, available for reaction with a second functionalizing compound. Where the first compound provides functionalization that can interact with one particulate filler such as carbon black, the second functionalizing compound typically provides functionalization that can interact with another particulate filler such as silica.

Based on the numbers and ranges set forth above with respect to the first functionalizing compound relative to equivalents of initiator, one can deduce the remaining amount of living polymer chains. Obviously, to a large extent, these ranges can depend on the ratio of filler materials used. Nevertheless, the numbers and ranges provided here are considered to be representative.

To ensure complete functionalization, i.e., to ensure that all available polymer chains are functionalized, an amount of the second functionalizing compound that is more than stoichiometric typically is used. In other words, the sum of equivalents of the first and second functionalizing compounds typically is slightly more than the equivalents of initiator used. (Again, the amount of functionalizing compound used is based on the equivalents of initiator added to the reactor, which does not necessarily reflect the amount of initiator actually associated with polymer chains.)

As described above with respect to A reactant materials, certain types of first functionalizing compounds react with the countercation of the carbanion through at least one electrophilic functionality, e.g., a halogen atom. Each time that this type of reaction occurs, one less polymer chain is available for further functionalization or reaction. While U.S. patent publ. no. 2006/0135701 A1 teaches that multiple functionalization on a polymer chain is preferable, in certain aspects of the present invention, a relatively small number of the polymer chains can include multiple functionalities. For example, the percentage of chains with multiple functionalities can be no more than about 25%, less than 25%, no more than about 20%, no more than about 15%, no more than about 10%, no more than about 5%, no more than about 2%, no more than about 1%, and even about 0% (i.e., essentially free of polymer chains with multiple functionalities).

Useful second functionalizing compounds include those known to provide interactivity with silica fillers. These include tetraalkyl orthosilicates, e.g., tetraethyl orthosilicate (TEOS), and alkyl alkoxysilanes of the general formula $R^1_p Si(OR^2)_{4-p}$ where the alkoxy groups can be the same or different; each $R^1$ independently can be a $C_1$-$C_{20}$ aliphatic, $C_5$-$C_{20}$ cycloaliphatic, or about $C_6$-$C_{20}$ aromatic group; each $R^2$ independently can be $C_1$-$C_6$; and p is an integer of from 1 to 3. In one embodiment, at least one $R^1$ group contains from 6 to 20 carbon atoms and the remainder of the $R^1$ groups, if any, contain from 1 to 3 carbon atoms. In one embodiment, $R^2$ can contain 1 to 4, preferably 1 or 2, carbon atoms and preferably is an alkyl group. At least one $R^2$ group can be much larger (in terms of the number of carbon atoms that it includes) than any $R^2$ group. Non-limiting examples include octyl triethoxysilane, octyl trimethoxysilane, trimethyl ethoxysilane, cyclohexyl triethoxysilane, isobutyl triethoxysilane, ethyl trimethoxysilane, cyclohexyl tributoxysilane, dimethyl diethoxysilane, methyl triethoxysilane (MTES), propyl triethoxysilane, hexyl triethoxysilane, heptyl triethoxysilane, nonyl triethoxysilane, octadecyl triethoxysilane, methyloctyl diethoxysilane, dimethyl dimethoxysilane, methyl trimethoxysilane, propyl trimethoxysilane, hexyl trimethoxysilane, heptyl trimethoxysilane, nonyl trimethoxysilane, octadecyl trimethoxysilane, methyloctyl dimethoxysilane, and mixtures thereof.

Functionalized alkoxysilanes also can be used as second functionalizing compounds. Examples include N-(3-triethoxysilylpropyl)-4,5-dihydroimidazole, N-allyl-aza-2,2-dimethoxysilacyclopentane, N-(n-butyl)-aza-2,2-dimethoxysilacyclopentane, 2,2-dimethoxy-1-thia-2-silacyclopentane, and 3-(triethoxysilyl)propylsuccinic anhydride, all of which are available from commercial suppliers such as Gelest, Inc. (Morrisville, Pa.).

Such materials can result in or provide alkoxysilane functional groups, which are known to provide excellent interactivity with silica fillers.

Where the first functionalized polymer includes at least one functional group including at least one nitrogen atom and the second functionalized polymer includes at least one functional group including at least one alkoxysilane moiety, certain desirable properties have been found to result from compositions where the first type of functional group (i.e., the functional group included in the first functionalized polymer) constitutes from about 25 to about 50% of the sum of the first and second types of functional groups. Other ranges for the percentage of first functional group to sum of first and second functional groups include from about 25 to about 40%, from about 25 to about 35%, from about 25 to about 30%, from about 30 to about 50%, from about 30 to about 45%, from about 30 to about 40%, from about 30 to about 35%, from about 35 to about 45%, from about 35 to about 40%, from about 40 to about 50%, and from about 40 to about 45%.

If desired, the combination of functionalized polymers can be further reacted or processed, for example through hydrolysis. For example, a protected amino functional group can be de-protected through hydrolysis, typically effected through the introduction of an acid. With respect to category A reactants, a strong inorganic protonic acid can be delivered in, e.g., a polar organic solvent. Use of a relatively strong protonic acid typically ensures extensive de-protection; in other words, the previously di-substituted nitrogen atom from the category A reactant (commonly located at the terminus of the polymer) yields an acidic cation, i.e., a —$NH_3^+$ group, and the carbanion becomes a polymer that includes an acidic cation of a primary amine functionality. With respect to category B reactants, acidic hydrolysis yields an acidic cation, i.e., a —$NRH_2^+$ group, and the carbanion becomes a polymer that includes an acidic cation of a secondary amine functionality.

Such hydrolysis also can convert alkoxy groups (attached to the Si atom of the alkoxysilane) to hydroxyl groups which then can condense to yield Si—O—Si crosslinks between functional groups.

An amine salt (i.e., an acidic cation of a primary or secondary amine functionality) can exhibit less interactivity with particulate filler than the corresponding primary or secondary (free) amine. Accordingly, neutralization (i.e., de-protonation) can be desirable. However, as discussed in more detail below, the polymer composition can undergo additional processing prior to neutralization. This additional processing optionally can begin with quenching and/or desolventization.

Quenching typically is conducted by stirring the functionalized polymers and an active hydrogen-containing compound (e.g., an alcohol) for up to about 120 minutes at temperatures of from about 30° C. to 150° C. Solvent can be removed by conventional techniques such as drum drying, extruder drying, vacuum drying or the like, which may be combined with coagulation with water, alcohol or steam, thermal desolvation, etc.; if coagulation is performed, oven drying may be desirable. Drum drying can help to protect the acidic cation of the amine functionality and, if coagulation is utilized, maintaining neutral or very slightly acidic conditions can be preferable.

After desolventization, the resulting polymers often are stored in the form of blocks or slabs. By allowing the amino functionality of some of the polymers to remain in the aforementioned acidic cation form, the amino functionality is protected against undesirable coupling, i.e., dimerization, caused by oxidation. In other words, the acidic salt form is less susceptible to oxidation (of the nitrogen atom) and the resulting coupling that often follows.

The functionalized polymers can be utilized in a tread stock compound or can be blended with any conventionally employed tread stock rubber including natural rubber and/or non-functionalized synthetic rubbers such as, e.g., one or more of poly(isoprene), SBR, poly(butadiene), butyl rubber, neoprene, EPR), EPDM, NBR, silicone rubbers, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber and the like. When functionalized polymers are blended with conventional rubber(s), the amounts can vary from about 5% to about 99% by wt. of the total rubber, with the conventional rubber(s) making up the balance of the total rubber. The minimum amount depends to a significant extent on the degree of hysteresis reduction desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, a property that can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface area of silicas generally is less than 450 $m^2/g$, and useful ranges of surface area include from about 32 to about 400 $m^2/g$, about 100 to about 250 $m^2/g$, and about 15° to about 220 $m^2/g$.

The pH of the silica filler is generally from about 5 to about 7 or slightly over, preferably from about 5.5 to about 6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of about 1 to about 100 parts by weight (pbw) per 100 parts of polymer (phr), preferably in an amount from about 5 to about 8° phr. The useful upper range is limited by the high viscosity imparted by fillers of this type.

Other useful fillers include all forms of carbon black including, but not limited to, furnace black, channel blacks and lamp blacks. Specific examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least about 35 $m^2/g$, are preferred; surface area values can be determined by ASTM D-1765 using the cetyltrimethyl-ammonium bromide (CTAB) technique. The carbon blacks may be in pelletized form or an unpelletized flocculent mass, although unpelletized carbon black can be preferred for use in certain mixers.

The amount of carbon black can be up to about 50 phr, with about 5 to about 40 phr being typical. When carbon black is used with silica, the amount of silica can be decreased to as low as about 1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of about 25%; accordingly, typical (combined) amounts of reinforcing fillers, i.e., silica and carbon black, is about 3° to 100 phr.

Addition of a coupling agent such as a silane is customary so as to enhance mixing of silica filler in, and interaction with, the elastomer(s). Generally, the amount of silane that is added ranges between about 4 and 20% by weight, based upon the weight of silica filler present in the elastomeric compound.

Coupling agents can have a general formula of Q-T-X, in which Q represents a functional group capable of bonding physically and/or chemically with a group on the surface of the silica filler (e.g., surface silanol groups); T represents a hydrocarbon group linkage; and X represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the X and Q functionalities mentioned above. One preferred coupling agent is bis[3-(triethoxysilyl)propyl]tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants also are useful. The additional fillers can be utilized in an amount of up to about 40 phr, preferably up to about 20 phr.

Other conventional rubber additives also can be added. These include, for example, process oils, plasticizers, antidegradants such as antioxidants and antiozonants, curing agents and the like.

All of the ingredients can be mixed using standard equipment such as, e.g., Banbury or Brabender mixers. Mixing typically occurs in two or more stages. During the first stage (i.e., that which is not intended to immediately precede vulcanization, often referred to as the masterbatch stage), mixing typically is begun at temperatures of ~120° to ~130° C. and increases until a so-called drop temperature, typically ~165° C., is reached; a significant portion of the mixing at this stage occurs at temperatures between about 140° and 160° C., often between about 145° and 155° C. Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Advantageously, some of the aforementioned additives, including particularly (but not necessarily limited to) certain curing agents and anti-degradants, are basic in nature due to, e.g., the presence of functionalities that include NH-containing moieties (e.g., amines and amides). For example, as described in more detail in conjunction with Tables 1a and 1b below, typical antioxidants include amines such as, e.g., N-phenyl-N'-(1,3-dimethylbutyl)-p-phenyldiamine, and typical accelerators (i.e., curing agents) include amides such as, e.g., benzothiazyl-2-cyclohexylsulfenamide, di(phenylthio)acetamide, etc., and amidines such as, e.g., N,N'-diphenyl guanidine.

After being mixed with the functionalized polymer(s), these types of basic additives contact any amine salts that are present and, in effect, neutralize the acidic amino cation, thereby creating free amine functionality. This neutralization typically does not require additional effort or processing steps, i.e., it can occur naturally during mixing and storage of the resulting rubber stock, regardless of form (e.g., slab, wigwag, etc.). If desired, one can include in the mixed components a strong inorganic base, a mixed base system such as pyridine/NaOH, or a very strong organic base such as a tetraalkylammonium hydroxide (e.g., $(CH_3)_4NOH$); however, use of such additional bases is not necessary under most circumstances.

Neutralization results in polymers with primary or secondary amino functional groups, optimally located at a terminus of a polymer. Both have been found to provide significant interactivity with particulate fillers, although the effect of primary amino functional groups seems to be particularly high.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To reduce the chances of undesirable scorching and/or premature onset of vulcanization, this mixing step often is done at lower temperatures, e.g., starting at ~60° to ~65° C. and not going higher than ~105° to ~110° C.

The presence of acidic cation-protected amine functionality also can impact mixing in a positive manner. In at least some circumstances, the presence of polymers with acidic cation-protected amine functionality has been found to lower the drop temperature during initial mixing (i.e., masterbatch stage) and, upon partial or full neutralization of the acidic cation so as to provide polymer with free amine functionality, raise the drop temperature during final mixing. Both of these effects typically are desirable.

Fully compounded mixtures typically are processed (e.g., milled) into sheets prior to being formed into any of a variety of components and then vulcanized, which typically occurs at ~5° to ~15° C. higher than the highest temperatures employed during the mixing stages, most commonly about 170° C.

The relevant teachings of all patents and patent publications set forth above are incorporated herein by reference.

The following non-limiting, illustrative examples provide the reader with detailed conditions and materials that can be useful in the practice of the present invention.

EXAMPLES

In the following examples, dried glass vessels previously sealed with extracted septum liners and perforated crown caps under a positive $N_2$ purge were used for all preparations. Butadiene in hexane, styrene (33% by wt.) in hexane, hexane, n-butyllithium, 2,2-bis(2'-tetrahydrofuryl)propane (1.6 M solution in hexane, stored over $CaH_2$), and butylated hydroxytoluene (BHT) in hexane were used.

The following commercially available reagents and starting materials, all of which were acquired from Sigma-Aldrich Co. (St. Louis, Mo.), were used without further purification unless otherwise noted: 1-(3-bromopropyl)-2,2,5,5-tetramethyl-1-aza-2,5-disilacyclopentane (97% purity), MTES (99% purity), and TEOS (99%+purity).

Testing data in the Examples was performed on filled compositions made according to the formulations shown in Tables 1a and 1b. In these tables, N-phenyl-N'-(1,3-dimethylbutyl)-p-phenyldiamine acts as an antioxidant while benzothiazyl-2-cyclohexyl-sulfenamide, N,N'-diphenyl guanidine, and di(phenylthio)acetamide act as accelerators. Each of these materials is an amine and, as described above, can act to neutralize the acidic cation of the amine functionality.

TABLE 1a

Compound formulation, carbon black only

| | Amount (phr) |
|---|---|
| Masterbatch | |
| polymer | 100 |
| carbon black (N343 type) | 55 |
| wax | 1 |
| N-phenyl-N'-(1,3-dimethylbutyl)-p-phenyldiamine | 0.95 |
| ZnO | 2.5 |
| stearic acid | 2 |
| aromatic processing oil | 10 |
| Final | |
| sulfur | 1.3 |
| benzothiazyl-2-cyclohexylsulfenamide | 1.7 |
| N,N'-diphenyl guanidine | 0.2 |
| TOTAL | 174.65 |

TABLE 1b

Compound formulation, carbon black and silica

| | Amount (phr) |
|---|---|
| Masterbatch | |
| polymer | 100 |
| silica | 30 |
| carbon black (N343 type) | 35 |
| N-phenyl-N'-(1,3-dimethylbutyl)-p-phenyldiamine | 0.95 |
| stearic acid | 1.5 |
| aromatic processing oil | 10 |
| Re-mill | |
| 60% disulfide silane on carrier | 4.57 |
| Final | |
| ZnO | 2.5 |
| sulfur | 1.7 |
| benzothiazyl-2-cyclohexylsulfenamide | 1.5 |
| di(phenylthio)acetamide | 0.25 |
| N,N'-diphenyl guanidine | 0.2 |
| TOTAL | 188.47 |

Data corresponding to "50° C. Dynastat tan δ" were acquired from tests conducted on a Dynastat™ mechanical spectrometer (Dynastatics Instruments Corp.; Albany, N.Y.) using the following conditions: 1 Hz, 2 kg static mass and 1.25 kg dynamic load, a cylindrical (9.5 mm diameter×16 mm height) vulcanized rubber sample, and 50° C.

Data corresponding to "Bound Rubber" were determined using the procedure described by J. J. Brennan et al., *Rubber Chem. and Tech.*, 40, 817 (1967).

Examples 1-6

Examples 1-4

To a $N_2$-purged reactor equipped with a stirrer were added 1.78 kg hexane, 0.38 kg styrene, and 2.32 kg butadiene (21.9% by wt. in hexane). The reactor was charged with 3.67 mL n-butyllithium (1.54 M in hexane), followed by 1.05 mL 2,2-bis(2'-tetrahydrofuryl)propane solution. The reactor jacket was heated to 50° C. and, after ~30 minutes, the batch temperature peaked at ~56° C. After an additional 15 minutes, the polymer cement was transferred from the reactor to dried glass vessels.

Two portions were reacted with, respectively, 1-(3-bromopropyl)-2,2,5,5-tetramethyl-1-aza-2,5-disilacyclopentane (sample 2) and TEOS (sample 3) in a 50° C. bath for 30 minutes. These and a non-functionalized polymer (sample 1) were coagulated in isopropanol containing BHT and drum dried.

A portion of sample 2 was hydrolyzed with a 1% HCl in THF solution (~1 hour at room temperature), followed by neutralization with an aqueous 10% NaOH solution over a few minutes at room temperature, to provide an unprotected primary amino functional group-terminated polymer (identified as sample 4 below). This was coagulated and drum dried as above.

Examples 5-6

The foregoing polymerization procedure was repeated except that 3.47 mL n-butyllithium solution was used, and the batch temperature peaked at ~58° C. was reached after ~24 minutes.

After an additional 15 minutes, 0.63 mL of 3.89 M 1-(3-bromopropyl)-2,2,5,5-tetramethyl-1-aza-2,5-disilacyclopentane in THF was added to the reactor; this resulted in an ~1:2 ratio of first functionalizing compound to initiator. After ~5 minutes, 1.1 mL of 4.55 M TEOS in hexane was added; this provided an ~1:1 ratio of second functionalizing compound to initiator (i.e., an excess of total functionalizing compounds). This mixture was agitated at ~50° C. for an additional 30 minutes.

A portion of this multi-functional polymer composition was hydrolyzed and neutralized as above; this became sample 6, while the non-hydrolyzed portion became sample 5. These samples were coagulated and drum dried as above.

Compound Preparation

Using the formulations shown in Tables 1a and 1b, vulcanizable elastomeric compounds containing reinforcing fillers were prepared from samples 1-6. Results of physical testing on these compounds are shown below in Table 2. For those rows that include two data points, the upper is for a formulation from Table 1a, and the lower is for a formulation from Table 1b.

TABLE 2

Testing data from Examples 1-6

| | 1 | 2 | 3 | 4 | 5 | 6 |
|---|---|---|---|---|---|---|
| $M_n$ (kg/mol) | 106 | 116 | 147 | 78 | 180 | 204 |
| $M_w/M_n$ | 1.06 | 1.28 | 2.24 | 1.80 | 1.62 | 1.90 |
| % coupling | 0 | 38.7 | 45.7 | 83.8 | 62.2 | 68.7 |
| $T_g$ (°C.) | −36.5 | −36.6 | −35.0 | −36.9 | −38.0 | −37.9 |
| Bound rubber (%) | 12.0 | 38.3 | 31.2 | 35.5 | 37.3 | 40.8 |
| | 15.5 | 32.1 | 62.0 | 34.6 | 50.1 | 51.1 |
| 171° C. MDR $t_{50}$ (min) | 2.9 | 2.9 | 2.9 | 2.7 | 2.8 | 2.4 |
| | 7.5 | 5.2 | 6.1 | 5.7 | 5.5 | 4.4 |
| 171° C. MH-ML (kg-cm) | 17.4 | 16.9 | 17.2 | 17.3 | 17.0 | 17.2 |
| | 23.0 | 23.8 | 20.4 | 25.0 | 22.1 | 21.3 |
| $ML_{1+4}$ @ 130° C. | 26.2 | 60.0 | 44.4 | 60.0 | 70.7 | 71.9 |
| | 62.5 | — | 93.0 | 117.0 | 115.3 | 99.9 |
| 300% modulus @ 23° C. (MPa) | 10.6 | 13.3 | 11.7 | 13.2 | 12.5 | 14.0 |
| | 9.1 | 10.5 | 15.0 | 11.7 | 12.6 | 14.2 |
| Tensile strength @ 23° C. (MPa) | 17.9 | 19.1 | 20.1 | 18.9 | 19.9 | 18.1 |
| | 13.4 | 15.8 | 18.6 | 14.2 | 18.4 | 18.9 |
| Temp. sweep 0° C. tan δ | 0.212 | 0.236 | 0.209 | 0.237 | 0.229 | 0.232 |
| | 0.184 | 0.188 | 0.245 | 0.192 | 0.202 | 0.220 |
| Temp. sweep 50° C. tan δ | 0.273 | 0.195 | 0.236 | 0.197 | 0.212 | 0.179 |
| | 0.221 | 0.195 | 0.189 | 0.194 | 0.199 | 0.194 |
| RDA 0.25-14% ΔG' (MPa) | 4.496 | 0.923 | 3.349 | 0.981 | 2.059 | 2.317 |
| | 9.638 | 5.493 | 3.197 | 6.449 | 3.919 | 2.771 |
| 50° C. RDA strain sweep | 0.2514 | 0.1280 | 0.2148 | 0.1162 | 0.1619 | 0.1684 |
| (5% strain) tan δ | 0.2235 | 0.1695 | 0.1778 | 0.1666 | 0.1533 | 0.1414 |
| 50° C. Dynastat tan δ | 0.2421 | 0.2206 | 0.2023 | 0.1237 | 0.1620 | 0.1618 |
| | 0.2087 | 0.1735 | 0.1627 | 0.1727 | 0.1663 | 0.1565 |

The 50° C. strain sweep data of Table 2 show that compounds of styrene/butadiene interpolymers with multiple functional groups (Examples 5 and 6) provide slightly less reduction in tan δ in a carbon black-only formulation than corresponding interpolymers with only a protected amino group or primary amine functional group (Examples 2 and 4, respectively). However, the multi-functional compounds exhibit markedly improved tan δ reduction in a mixed filler system.

Similarly, comparing the same data for Examples 5 and 3, significant improvement in tan δ reduction in a carbon black-only formulation and moderate improvement in a mixed filler formulation can be achieved. The latter is especially surprising in view of the fact that fewer chains would seem to include alkoxysilane functionality.

Higher tan δ at 0° C. values correspond generally to better wet traction performance. The data of Table 2 indicate that Examples 5 and 6 perform at least comparably to those not involving a combination of functional groups (Examples 2-4).

Examples 7-12

The polymerization procedure described with respect to Examples 1-6 was, in substantial part, repeated. A non-functionalized control polymer was processed as described with respect to Examples 1-6 (sample 7).

As a comparative, one portion of the polymer cement was reacted with an excess of MTES (sample 8) prior to being coagulated in isopropanol and drum dried.

Portions of the polymer were reacted with 1-(3-bromopropyl)-2,2,5,5-tetramethyl-1-aza-2,5-disilacyclopentane. One was reacted with ~0.5 equivalents (based on the amount of n-BuLi initiator utilized), another with ~0.3 equivalents, and a third with ~0.7 equivalents. These are designated functionalized samples A, B, and C below.

Functionalized sample A was further reacted with 1 equivalent (based on the amount of n-BuLi initiator) of MTES. One portion of this (sample 11) was coagulated in isopropanol and drum dried. Another portion of this multifunctional polymer composition was hydrolyzed and neutralized as above prior to being coagulated and drum dried (sample 12).

Functionalized sample B was further reacted with 1 equivalent of MTES (sample 10) prior to being coagulated in isopropanol and drum dried.

Functionalized sample C was further reacted with 1 equivalent of MTES (sample 9) prior to being coagulated in isopropanol and drum dried.

Using the formulations shown in Tables 1a and 1b above, vulcanizable elastomeric compounds containing reinforcing fillers were prepared from samples 7-12. Results of physical testing on these compounds are shown below in Table 3.

TABLE 3

Testing data from Examples 7-12

| | 7 | 8 | 9 | 10 | 11 | 12 |
|---|---|---|---|---|---|---|
| $M_n$ (kg/mol) | 100 | 109 | 117 | 124 | 122 | 126 |
| $M_w/M_n$ | 1.06 | 1.11 | 1.15 | 1.15 | 1.16 | 1.27 |
| % coupling | 1.8 | 15.9 | 28.6 | 27.1 | 37.1 | 55.1 |
| $T_g$ (°C.) | −38.1 | −38.5 | −38.8 | −38.2 | −36.4 | −36.5 |

TABLE 3-continued

Testing data from Examples 7-12

|  | 7 | 8 | 9 | 10 | 11 | 12 |
|---|---|---|---|---|---|---|
| Bound rubber (%) | 8.1 | 13.9 | 24.5 | 21.6 | 18.3 | 21.5 |
|  | 16.5 | 60.0 | 73.6 | 66.3 | 64.5 | 60.7 |
| 171° C. MDR $t_{50}$ (min) | 2.6 | 2.6 | 2.8 | 2.7 | 2.6 | 2.0 |
|  | 7.9 | 5.6 | 5.7 | 5.1 | 5.4 | 4.9 |
| 171° C. MH-ML (kg-cm) | 17.7 | 18.3 | 18.0 | 18.4 | 17.9 | 16.2 |
|  | 21.9 | 18.5 | 17.7 | 18.5 | 17.6 | 19.3 |
| $ML_{1+4}$ @ 130° C. | 23.6 | 30.8 | 39.2 | 42.5 | 38.9 | 56.3 |
|  | 58.9 | 89.6 | 85.2 | 99.9 | 91.6 | 96.3 |
| 300% modulus @ 23° C. (MPa) | 10.9 | 11.5 | 13.2 | 13.0 | 12.7 | 11.6 |
|  | 8.7 | 14.7 | 15.9 | 14.6 | 14.7 | 14.5 |
| Tensile strength @ 23° C. (MPa) | 16.0 | 17.1 | 18.7 | 16.9 | 18.9 | 18.5 |
|  | 12.8 | 18.3 | 15.5 | 19.0 | 16.2 | 17.7 |
| Temp. sweep 0° C. tan δ | 0.191 | 0.203 | 0.213 | 0.209 | 0.219 | 0.213 |
|  | 0.160 | 0.187 | 0.228 | 0.203 | 0.216 | 0.212 |
| Temp. sweep 50° C. tan δ | 0.261 | 0.253 | 0.235 | 0.236 | 0.252 | 0.239 |
|  | 0.231 | 0.187 | 0.162 | 0.177 | 0.180 | 0.179 |
| RDA 0.25-14% ΔG' (MPa) | 5.009 | 4.333 | 1.938 | 2.067 | 3.052 | 2.203 |
|  | 9.283 | 2.113 | 2.149 | 1.948 | 2.188 | 2.758 |
| 50° C. RDA strain sweep | 0.2543 | 0.2209 | 0.1694 | 0.1731 | 0.2078 | 0.1875 |
| (5% strain) tan δ | 0.2314 | 0.1609 | 0.1525 | 0.1413 | 0.1572 | 0.1543 |
| 50° C. Dynastat tan δ | 0.2390 | 0.2144 | 0.1647 | 0.1611 | 0.1941 | 0.1779 |
|  | 0.2062 | 0.1565 | 0.1518 | 0.1437 | 0.1502 | 0.1559 |

The 50° C. strain sweep data of Table 3 show that compounds of styrene/butadiene interpolymers with multiple functional groups (Examples 9-12) provide reductions in tan δ in both carbon black-only and mixed filler (silica/carbon black) formulations than corresponding interpolymers with no or MTES-only functionalization (Examples 7 and 8, respectively).

That same data show that Example 10 (~0.3:1 first functionalization and ~0.7:1 second functionalization) exhibited the maximum reduction in tan δ in a mixed filler formulation.

With respect to tan δ at 0° C. values, the data of Table 3 indicate that Examples 9-12 were comparable to Example 8.

Examples 13-17

The polymerization procedure described with respect to Examples 1-6 was, in substantial part, repeated. However, a di-functional initiator made by reacting sec-butyllithium with 1,3-diisopropenylbenzene was used so that most of the living polymers (carbanions) formed had two live sites instead of one.

A non-functionalized control polymer (sample 13) was processed as described above with respect to sample 1.

Some of the living cement was reacted sequentially with 1-(3-bromopropyl)-2,2,5,5-tetramethyl-1-aza-2,5-disilacyclopentane and TEOS as described with respect to samples 5-6 above. A portion of this sequentially functionalized polymer was hydrolyzed as described with respect to sample 6 above. These became samples 14 and 15, respectively.

Another portion of the living cement was reacted with 1-(3-bromopropyl)-2,2,5,5-tetramethyl-1-aza-2,5-disilacyclopentane as described with respect to sample 2 above. A portion of this functionalized polymer was hydrolyzed as described with respect to sample 4 above. These became samples 16 and 17, respectively.

All samples were coagulated and drum dried as in previous examples.

Using the formulations shown in Tables 1a and 1b above, vulcanizable elastomeric compounds containing reinforcing fillers were prepared from samples 13-17. Results of physical testing on these compounds are shown below in Table 4. (Example 14 could not be processed in a mixed filler system, so it does not include a second set of data in the table that follows.)

TABLE 4

Testing data from Examples 13-17

|  | 13 | 14 | 15 | 16 | 17 |
|---|---|---|---|---|---|
| $M_n$ (kg/mol) | 118 | 113 | 89 | 152 | 154 |
| $M_w/M_n$ | 1.05 | 1.94 | 2.18 | 1.43 | 1.45 |
| % coupling | 0.0 | 53.8 | 56.4 | 57.4 | 58.9 |
| $T_g$ (° C.) | −38.1 | −36.2 | −36.7 | −36.7 | −36.9 |
| Bound rubber (%) | 13.7 | 66.8 | 53.6 | 67.6 | 62.1 |
|  | 19.1 | n/a | 67.8 | 52.4 | 51.4 |
| 171° C. MDR $t_{50}$ (min) | 3.0 | 2.6 | 1.8 | 2.4 | 2.3 |
|  | 7.1 | n/a | 3.4 | 3.9 | 3.5 |
| 171° C. MH-ML (kg-cm) | 17.7 | 16.4 | 15.4 | 14.8 | 15.5 |
|  | 22.9 | n/a | 21.5 | 20.8 | 24.3 |
| $ML_{1+4}$ @ 130° C. | 31.1 | (A) | 109.9 | (A) | (A) |
|  | 71.7 | n/a | (A) | (A) | (A) |

TABLE 4-continued

Testing data from Examples 13-17

| | 13 | 14 | 15 | 16 | 17 |
|---|---|---|---|---|---|
| 300% modulus @ 23° C. (MPa) | 10.9 | 15.2 | 14.5 | 15.9 | 16.2 |
| | 9.4 | n/a | 17.0 | 13.6 | 13.9 |
| Tensile strength @ 23° C. (MPa) | 18.1 | 17.7 | 20.4 | 19.3 | 18.8 |
| | 14.8 | n/a | 19.2 | 16.4 | 19.0 |
| Temp. sweep 0° C. tan δ | 0.187 | 0.260 | 0.242 | 0.254 | 0.247 |
| | 0.192 | n/a | 0.250 | 0.223 | 0.217 |
| Temp. sweep 50° C. tan δ | 0.247 | 0.127 | 0.139 | 0.119 | 0.126 |
| | 0.226 | n/a | 0.147 | 0.158 | 0.158 |
| RDA 0.25-14% ΔG' (MPa) | 4.079 | 1.823 | 1.383 | 0.993 | 1.174 |
| | 8.458 | n/a | 4.144 | 2.980 | 3.719 |
| 50° C. RDA strain sweep (5% strain) tan δ | 0.2377 | 0.1345 | 0.1302 | 0.1062 | 0.1129 |
| | 0.2232 | n/a | 0.1457 | 0.1325 | 0.1344 |
| 50° C. Dynastat tan δ | 0.2395 | 0.1298 | 0.1256 | 0.1077 | 0.1092 |
| | 0.2119 | n/a | 0.1420 | 0.1332 | 0.1352 |

(A) Too high to be measured by equipment used

The data from Table 4 show that the use of multifunctional initiators can result in polymers that have multiple functionalities on the same chain, but that these polymers can present some processing challenges when incorporated into filled compositions. Nevertheless, such functionalized polymers can result in significant reductions in tan δ in both carbon black-only and mixed silica/carbon black formulations relative to corresponding interpolymers with no functionalization.

That which is claimed is:

1. A method for making a filled composition that comprises at least two types of particulate fillers comprising:
    a) providing a composition comprising carbanionic polymer chains;
    b) allowing a portion of said chains to react with a first compound so as to provide a first functionalized polymer; and
    c) introducing a second compound to said composition and allowing another portion of said chains to react with said second compound so as to provide a second functionalized polymer in the presence of said first functionalized polymer,
    wherein said first functionalized polymer interacts with one type of particulate filler and said second functionalized polymer interacts with another type of particulate filler.

2. The method of claim 1 wherein said first compound comprises a protected amino group.

3. The method of claim 2 wherein said first functionalized polymer comprises at least one functional group comprising at least one nitrogen atom, said at least one functional group being derived from said protected amino group.

4. The method of claim 2 wherein said first compound further comprises electrophilic functionality.

5. The method of claim 2 wherein said first compound comprises at least one —NR'—C(Z)— moiety where Z is S or O and R' is an alkyl or aryl group.

6. The method of claim 1 wherein said first compound comprises at least one C=N moiety.

7. The method of claim 6 wherein said first compound is an oxime, imine, azine, or hydrazone.

8. The method of claim 1 wherein said second compound is a tetraalkyl ortho-silicate or an alkyl alkoxysilane.

9. The method of claim 8 wherein said second functionalized polymer comprises at least one functional group comprising an alkoxysilane moiety.

10. The method of claim 9 wherein said first functionalized polymer comprises at least one functional group comprising at least one nitrogen atom.

11. The method of claim 10 wherein said at least one functional group comprising at least one nitrogen atom comprises from about 25 to about 35% of the sum of the functional groups comprising at least one nitrogen atom and the functional groups comprising an alkoxysilane moiety.

12. The method of claim 1 wherein said composition further comprises a solvent.

13. The method of claim 12 further comprising removing substantially all of said solvent from said composition.

14. The method of claim 13 further comprising blending said composition and at least two types of particulate fillers.

15. The method of claim 14 wherein said blending occurs in the presence of at least one vulcanization accelerator and antioxidant.

16. The method of claim 15 further comprising adding a vulcanizing agent.

17. The method of claim 16 further comprising vulcanizing said filled composition.

18. The method of claim 1 further comprising adding at least one other type of rubber to said filled composition.

19. The method of claim 18 further comprising adding a vulcanizing agent.

20. The method of claim 19 further comprising vulcanizing said filled composition.

* * * * *